United States Patent
Ambroise et al.

(10) Patent No.: US 11,712,878 B2
(45) Date of Patent: Aug. 1, 2023

(54) CO-EXTRUDED, BIAXIALLY ORIENTED, MATTE HDPE FILMS

(71) Applicant: Jindal Films Americas LLC, LaGrange, GA (US)

(72) Inventors: Benoît Ambroise, Nobressart (BE); Alain Marchall, Villers-le-Rond (FR); Robert M Sheppard, Peachtree City, GA (US); Christophe Guillaume, Namur (BE); Detlef Hütt, Heusweiler (DE)

(73) Assignee: Jindal Films Americas LLC, LaGrange, GA (US)

( * ) Notice: Subject to any disclaimer, the term of this patent is extended or adjusted under 35 U.S.C. 154(b) by 91 days.

(21) Appl. No.: 17/219,736

(22) Filed: Mar. 31, 2021

(65) Prior Publication Data

US 2021/0213719 A1    Jul. 15, 2021

Related U.S. Application Data

(63) Continuation of application No. PCT/US2020/038376, filed on Jun. 18, 2020.

(60) Provisional application No. 62/908,628, filed on Oct. 1, 2019, provisional application No. 62/865,558, filed on Jun. 24, 2019, provisional application No. 62/865,570, filed on Jun. 24, 2019, provisional application No. 62/863,938, filed on Jun. 20, 2019.

(51) Int. Cl.

| | |
|---|---|
| B32B 27/32 | (2006.01) |
| B32B 7/12 | (2006.01) |
| B32B 27/08 | (2006.01) |
| B32B 27/16 | (2006.01) |
| B32B 27/18 | (2006.01) |
| B32B 27/20 | (2006.01) |
| B32B 27/36 | (2006.01) |
| B29C 48/08 | (2019.01) |
| B29C 48/21 | (2019.01) |
| B65D 65/40 | (2006.01) |
| B29C 48/00 | (2019.01) |
| B29C 55/14 | (2006.01) |
| B29K 23/00 | (2006.01) |
| B29K 105/00 | (2006.01) |

(52) U.S. Cl.
CPC .......... *B32B 27/32* (2013.01); *B29C 48/0018* (2019.02); *B29C 48/08* (2019.02); *B29C 48/21* (2019.02); *B29C 55/143* (2013.01); *B32B 7/12* (2013.01); *B32B 27/08* (2013.01); *B32B 27/16* (2013.01); *B32B 27/18* (2013.01); *B32B 27/20* (2013.01); *B32B 27/327* (2013.01); *B65D 65/40* (2013.01); *B29K 2023/065* (2013.01); *B29K 2023/0633* (2013.01); *B29K 2023/12* (2013.01); *B29K 2105/0008* (2013.01); *B32B 2250/03* (2013.01); *B32B 2250/05* (2013.01); *B32B 2250/24* (2013.01); *B32B 2250/242* (2013.01); *B32B 2255/10* (2013.01); *B32B 2255/20* (2013.01); *B32B 2255/205* (2013.01); *B32B 2255/26* (2013.01); *B32B 2270/00* (2013.01); *B32B 2307/30* (2013.01); *B32B 2307/516* (2013.01); *B32B 2307/518* (2013.01); *B32B 2307/72* (2013.01); *B32B 2307/7244* (2013.01); *B32B 2307/7246* (2013.01); *B32B 2307/732* (2013.01); *B32B 2439/40* (2013.01); *B32B 2439/46* (2013.01); *B32B 2439/70* (2013.01); *B32B 2553/00* (2013.01)

(58) Field of Classification Search
None
See application file for complete search history.

(56) References Cited

U.S. PATENT DOCUMENTS

| | | |
|---|---|---|
| 2002/0182390 A1 | 12/2002 | Migliorini et al. |
| 2002/0182435 A1 | 12/2002 | Migliorini et al. |
| 2003/0008153 A1 | 1/2003 | Migliorini et al. |
| 2003/0211350 A1* | 11/2003 | Migliorini ............... B32B 27/32 428/500 |
| 2010/0172602 A1* | 7/2010 | O'Donnell ............... B32B 7/12 264/151 |
| 2011/0212338 A1 | 9/2011 | Ambroise |

FOREIGN PATENT DOCUMENTS

WO     2017210403 A1    12/2017

OTHER PUBLICATIONS

Young, Lee W., International Search Report and Written Opinion on PCT/US20/38376, dated Sep. 21, 2020, USPTO as RO for WIPO, Alexandria, US.
Osterrieder, Erik J., Demand on PCT/US20/38376, Feb. 17, 2021, Houston, US.

* cited by examiner

*Primary Examiner* — Sheeba Ahmed
(74) *Attorney, Agent, or Firm* — Kearney McWilliams Davis; Erik Osterrieder

(57) ABSTRACT

Disclosed are compositions and methods for multilayer films, which, in one embodiment may comprise a core layer comprising at least 50 wt. % of high-density polyethylene. Further, the multilayer film may include a first skin layer comprising at least 80 wt. % of high-density polyethylene, and a second skin layer comprising either: (i) one or more low-density polyethylenes; or (ii) one or more polypropylene-based copolymers. The multilayer film may be oriented in at least one direction.

23 Claims, No Drawings

CO-EXTRUDED, BIAXIALLY ORIENTED, MATTE HDPE FILMS

REFERENCE TO RELATED APPLICATIONS

This is a continuation application, which claims priority to Patent Treaty Cooperation application number PCT/US20/38376 filed on Jun. 18, 2020 that claims priority to each of United States provisional patent application Ser. Nos. 62/908,628 filed on 1 Oct. 2019, 62/865,570 filed on 24 Jun. 2019, 62/865,558 filed on 24 Jun. 2019, and 62/863,938 filed on 20 Jun. 2019, wherein each of the foregoing is hereby incorporated by this reference in its entity and is owned by Applicant.

FIELD

This application relates to multilayer films that may have oriented layer(s), such as the core, tie, and/or skin layers, and include polyethylene in one or more layers of the film.

BACKGROUND

This disclosure provides for new multilayer films and methods that provide matte films, all or some of which may be recyclable, particularly for embodiments containing all polyethylene. Additionally and alternatively, the disclosed multilayer films and methods may have improved stiffness. Alongside the foregoing functional and environmental improvements, these new multilayer films may be use in laminating, packaging and/or labelling applications.

SUMMARY

Disclosed are compositions and methods for multilayer films, which, in one embodiment may include a core layer comprising at least 50 wt. % of high-density polyethylene. Further, the multilayer film may include a first skin layer comprising at least 80 wt. % of high-density polyethylene, and a second skin layer comprising either: (i) one or more low-density polyethylenes; or (ii) one or more polypropylene-based copolymers. The multilayer film may be oriented in at least one direction.

DETAILED DESCRIPTION

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are described now, including exemplary embodiments and definitions that are adopted herein for purposes of understanding. While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

Generally, disclosed are oriented (i.e., monoaxially and/or biaxially), multilayer, polyethylene ("PE") films that are optionally laminated to PE substrate, metallized or not, so as to create a mono-material laminate in some embodiments, which may, for instance, permit easy recycling, and/or in some embodiments improve stiffness as compared to incumbent films and laminates thereof.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film, wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

As used herein, "plastomer" is defined as a propylene-based or ethylene-based copolymer having a density in the range of 0.850 g/cm$^3$ to 0.920 g/cm$^3$ and a DSC melting point of at least 40° C.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

By "consist essentially of," what is meant, for example, is that a particular film layer does not have any more than 1 wt % or 2 wt % or 3 wt % or 4 wt % or 5 wt % of other polymers in the bulk material constituting the film layer's composition, but "consist essentially of" does not exclude the possibility that the particular film layer also has additives, such as anti-slip agents, anti-blocking agents, anti-oxidants, pigments, whitening agents, cavitation agents, etc. regardless of what polymers or other materials make up the additive(s).

As used herein, "about" means the number itself and/or within 5% of the stated number. For instance, with about 5%, this means 5 and/or any number or range within the range of 4.75 to 5.25, e.g., 4.75 to 4.96, 4.81 to 5.1, etc.

Core Layer

As is known to those skilled in the art, the core layer of a multilayered film is most commonly the thickest layer and provides the foundation of the multilayered structure. In some embodiments, the core layer comprises, consists essentially of, or consists of biaxially oriented polyethylene ("BOPE"), such as a high-density polyethylene film ("HDPE") and/or other PE's having a density greater than 0.94 g/cm$^3$. In various embodiments, the core layer comprises at least 50 wt %, at least 60 wt %, at least 70 wt %, at least 80 wt %, at least 85 wt %, at least 90 wt %, at least 95 wt %, or more of HDPE. In alternative embodiments, the core layer may also include other polymers, including, for instance, biaxially oriented polypropylene ("BOPP"), biaxially oriented polyester ("BOPET"), biaxially oriented polylactic acid ("BOPLA"), and combinations thereof. In still alternate embodiments the core layer may also contain lesser amounts of additional polymer(s) selected from the group consisting of ethylene polymer, ethylene-propylene copolymers, ethylene-propylene-butene terpolymers, elastomers, plastomers, different types of metallocene-LLDPEs (m-LLDPEs), and combinations thereof.

The core layer may further include a hydrocarbon resin. Hydrocarbon resins may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight less than 5000, preferably less than 2000, most preferably in the range of from 500 to 1000. The resin can be natural or synthetic and may have a softening point in the range of from 60° C. to 180° C.

Suitable hydrocarbon resins include, but are not limited to petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

The amount of such hydrocarbon resins, either alone or in combination, in the core layer is preferably less than 20 wt %, more preferably in the range of from 1 wt % to 5 wt %, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 10 wt %, based on the total weight of the core layer.

Preferably, the total amount of additives in the core layer comprises up to about 20 wt. % of the core layer, but some embodiments may comprise additives in the core layer in an amount up to about 30 wt % of the core layer.

The core layer preferably has a thickness in the range of from about 5 μm to 100 μm, more preferably from about 5 μm to 50 μm, most preferably from 5 μm to 25 μm.

Optional Tie Layer(s)

Tie layer(s) of a multilayered film is typically used to connect two other layers of the multilayered film structure, e.g., a core layer and a sealant layer, and is positioned intermediate these other layers. In various embodiments, the films may have zero, one or two tie layers. The tie layer(s) may have the same or a different composition as compared to the core layer.

In some embodiments, the tie layer is in direct contact with the surface of the core layer. In other embodiments, another layer or layers may be intermediate the core layer and the tie layer. The tie layer may comprise one or more polymers. In addition, the polymers may include $C_2$ polymers, maleic-anhydride-modified polyethylene polymers, $C_3$ polymers, $C_2C_3$ random copolymers, $C_2C_3C_4$ random terpolymers, heterophasic random copolymers, $C_4$ homopolymers, $C_4$ copolymers, metallocene polymers, propylene-based or ethylene-based elastomers and/or plastomers, ethyl-methyl acrylate (EMA) polymers, ethylene-vinyl acetate (EVA) polymers, polar copolymers, and combinations thereof. For example, one polymer may be a grade of VISTAMAXX™ polymer (commercially available from ExxonMobil Chemical Company of Baytown, Tex.), such as VM6100 and VM3000 grades. Alternatively, suitable polymers may include VERSIFY™ polymer (commercially available from The Dow Chemical Company of Midland, Mich.), Basell CATALLOY™ resins such as ADFLEX™ T100F, SOFTELL™ Q020F, CLYRELL™ SM1340 (commercially available from Basell Polyolefins of The Netherlands), PB (propylene-butene-1) random copolymers, such as Basell PB 8340 (commercially available from Basell Polyolefins of The Netherlands), Borealis BORSOFT™ SD233CF, (commercially available from Borealis of Denmark), EXCEED™ 1012CA and 1018CA metallocene polyethylenes, EXACT™ 5361, 4049, 5371, 8201, 4150, 3132 polyethylene plastomers, EMCC 3022.32 low density polyethylene (LDPE) (commercially available from ExxonMobil Chemical Company of Baytown, Tex.).

In some embodiments, the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer is typically in the range of from about 0.50 to 25 μm, preferably from about 0.50 μm to 12 μm, more preferably from about 0.50 μm to 6 μm, and most preferably from about 2.5 μm to 5 μm. However, in some thinner films, the tie layer thickness may be from about 0.5 μm to 4 μm, or from about 0.5 μm to 2 μm, or from about 0.5 μm to 1.5 μm.

In various embodiments, the film, whether laminated or not, may have one or more tie layers. In some of these embodiments, at least one of the one or more tie layers is matte. In some other embodiments, at least one of the one or more tie layers is clear/transparent.

Skin Layer(s), Including Metallizable Skin Layers and Printable Layers

In some embodiments, the skin layer comprises at least one polymer selected from the group comprising, consisting essentially of, and/or consisting of polyethylene copolymers or terpolymers, which may be grafted or copolymerized. In some embodiments, the polyethylene(s) may comprise an acid-containing portion, which may be acrylic-acid based, methacrylic-acid based, another organic acid, or combinations thereof. The acid-containing portion of the acid-containing polymer may be from 4 wt % through 20 wt %, or 6 wt % through 16 wt %, or 8 wt % through 12 wt %. As examples, Exxon Mobil Escor EAA resins or Dupont Nucrel EAA resins or Dow Primacor EAA resins might be used. For metallizing or barrier properties, the acid-modified skin layer may contain LLDPE or ethylene vinyl alcohol based polymer(s) ("EVOH"), a suitable EVOH copolymer is EVAL™ G176B or XEP 1300 (commercially available from Kuraray Company Ltd. of Japan).

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.20 μm through 3.5 μm, or from 0.30 μm through 2 μm, or in many embodiments, from 0.50 μm through 1.0 µm. In thin film embodiments, the skin layer thickness may range from about 0.20 µm through 1.5 µm, or 0.50 µm through 1.0 µm.

Additives

Additives present in the film's layer(s) may include, but are not limited to opacifying agents, pigments, colorants, cavitating agents, slip agents, antioxidants, anti-fog agents, anti-static agents, anti-block agents, fillers, moisture barrier additives, gas barrier additives, gas scavengers, and combinations thereof. Such additives may be used in effective amounts, which vary depending upon the property required, and may be added to one or more of the film's layer(s) in solid or solution form, e.g., part of a masterbatch solution or otherwise.

Examples of suitable opacifying agents, pigments or colorants are iron oxide, carbon black, aluminum, titanium dioxide ($TiO_2$), calcium carbonate ($CaCO_3$), and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 µm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is erucamide.

Non-migratory slip agents, used in one or more skin layers of the multilayered films, may include polymethyl methacrylate (PMMA). The non-migratory slip agent may have a mean particle size in the range of from about 0.5 µm to 8 µm, or 1 µm to 5 µm, or 2 µm to 4 µm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Optionally, nonionic or anionic wax emulsions can be included in the coating(s), i.e., skin layer(s), to improve blocking resistance and/or lower the coefficient of friction. For example, an emulsion of Michem Lube 215, Michem Lube 160 may be included in the skin layer(s). Any conventional wax, such as, but not limited to Carnauba™ wax (commercially available from Michelman Corporation of Cincinnati, Ohio) that is useful in thermoplastic films is contemplated.

Metallization

The outer surface (i.e., side facing away from the core) of a skin layer and/or laminating substrate may undergo metallization after optionally being treated. Metallization may be carried out through conventional methods, such as vacuum metallization by deposition of a metal layer such as aluminum, copper, silver, chromium, or mixtures thereof. Following metallization, a coating may be applied to the outer metallized layer "outside" or "inside" the vacuum chamber to result in the following structure: metallized layer/skin layer/optional tie layer/core/optional tie layer/skin layer/metallized layer. In an additional embodiment, a primer may be applied on the metal surface(s) followed by top coating(s).

In certain embodiments, the metal for metallization is metal oxide, any other inorganic materials, or organically modified inorganic materials, which are capable of being vacuum deposited, electroplated or sputtered, such as, for example, SiOx, AlOx, SnOx, ZnOx, IrOx, wherein x=1 or 2, organically modified ceramics "ormocer", etc. The thickness of the deposited layer(s) is typically in the range from 100 to 5,000 Angstrom or preferably from 300 to 3000 Angstrom.

Surface Treatment

One or both of the outer surfaces of the multilayered films may be surface-treated to increase the surface energy to render the film receptive to metallization, coatings, printing inks, adhesives, and/or lamination. The surface treatment can be carried out according to one of the methods known in the art including corona discharge, flame, plasma, chemical treatment, or treatment by means of a polarized flame.

Priming

An intermediate primer coating may be applied to multilayered films. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy, poly(ethylene imine) (PEI), and polyurethane materials. U.S. Pat. Nos. 3,753,769, 4,058,645 and 4,439,493, each incorporated herein by reference, discloses the use and application of such primers. The primer provides an overall adhesively active surface for thorough and secure bonding with the subsequently applied coating composition and can be applied to the film by conventional solution coating means, for example, by roller application.

Orienting

The films herein are also characterized in certain embodiments as being biaxially oriented. The films can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the tentered method. In the tentered process, line speeds of greater than 100 m/min to 400 m/min or more, and outputs of greater than 2000 kg/h to 4000 kg/h or more are achievable. In the tenter process, sheets/films of the various materials are melt blended and coextruded, such as through a 3, 4, 5, 7-layer die head, into the desired film structure. Extruders ranging in diameters from 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation. It is understood by those skilled in the art that this temperature range can vary depending upon the equipment, and in particular, upon the identity and composition of the components making up the film. Ideally, the temperature will be below that which will melt the film, but high enough to facilitate the machine direction orientation process. Such temperatures referred to herein refer to the film temperature itself. The film temperature can be measured by using, for example, infrared spectroscopy, the source aimed at the film as it is being processed; those skilled in the art will understand that for transparent films, measuring the actual film temperature will not be as precise. The heating means for the film line may be set at any appropriate level of heating, depending upon the instrument, to achieve the stated film temperatures.

The lengthened and thinned film is passed to the tenter section of the line for TD orientation. At this point, the edges of the sheet are grasped by mechanical clips on continuous chains and pulled into a long, precisely controlled hot air oven for a pre-heating step. The film temperatures range from 100 or 110 to 150 or 170 or 180° C. in the pre-heating step. Again, the temperature will be below that which will melt the film, but high enough to facilitate the step of transverse direction orientation. Next, the edges of the sheet are grasped by mechanical clips on continuous chains and pulled into a long, precisely controlled hot air oven for transverse stretching. As the tenter chains diverge a desired amount to stretch the film in the transverse direction, the process temperature is lowered by at least 2° C. but typically no more than 20° C. relative to the pre-heat temperature to maintain the film temperature so that it will not melt the film. After stretching to achieve transverse orientation in the film, the film is annealed at a temperature below the melting point, and the film is then cooled from 5 to 10 or 15 or 20 or 30 or 40° C. below the stretching temperature, and the clips are released prior to edge trim, optional coronal, printing and/or other treatment can then take place, followed by winding.

Thus, TD orientation is achieved by the steps of pre-heating the film having been machine oriented, followed by stretching and annealing it at a temperature below the melt point of the film, and then followed by a cooling step at yet a lower temperature. In one embodiment, the films described herein are formed by imparting a transverse orientation by a process of first pre-heating the film, followed by a decrease in the temperature of the process within the range of from 2 or 3 to 5 to 10 or 15 or 20° C. relative to the pre-heating temperature while performing transverse orientation of the film, followed by a lowering of the temperature within the range of from 5° C. to 10 or 15 or 20 or 30 or 40° C. relative to the melt point temperature, holding or slightly decreasing (more than 5%) the amount of stretch, to allow the film to anneal. The latter step imparts the low TD shrink characteristics of the films described herein. Thus, for example, where the pre-heat temperature is 120° C., the stretch temperature may be 114° C., and the cooling step may be 98° C., or any temperature within the ranges disclosed. The steps are carried out for a sufficient time to affect the desired film properties as those skilled in the art will understand.

Thus, in certain embodiments the film(s) described herein are biaxially oriented with at least a 5 or 6 or 7 or 8-fold TD orientation and at least a 2 or 3 or 4-fold MD orientation. Being so formed, the at least three-layer (one core, two skin layers, 18-21 μm thickness) possess an ultimate tensile strength within the range of from 100 or 110 to 80 or 90 or 200 MPa in the TD in certain embodiments; and possess an ultimate tensile strength within the range of from 30 or 40 to 150 or 130 MPa in the MD in other embodiments. Further, the SCS films described herein possess an MD Elmendorf tear is greater than 10 or 15 g in certain embodiments, and the 25 TD Elmendorf tear is greater than 15 or 20 g in other embodiments.

INDUSTRIAL APPLICABILITY

The disclosed multilayered films may be stand-alone films, laminates, or webs. Or, the multilayered films may be sealed, coated, metallized, and/or laminated to other film structures. The laminating substrate, itself, may for instance, be a BOPE or a non-oriented, cast or blown PE film with or without the assistance of adhesive(s), increases in temperature and/or pressure, water or solvents, etc.; furthermore, the laminating substrate may or may not be metallized and/or coated. The disclosed multilayered films may be prepared by any suitable methods comprising the steps of co-extruding a multilayered film according to the description and claims of this specification, orienting and preparing the film for intended use such as by coating, printing, slitting, or other converting methods.

For some applications, it may be desirable to laminate the multilayered films to other polymeric film or paper products for purposes such as package decor including printing and metallizing. These activities are typically performed by the ultimate end-users or film converters who process films for supply to the ultimate end-users.

The prepared multilayered film may be used as a flexible packaging film to package an article or good, such as a food item or other product. In some applications, the film may be formed into a pouch type of package, such as may be useful for packaging a beverage, liquid, granular, or dry-powder product.

EXAMPLE EMBODIMENTS

The following are example, recyclable films in line with the foregoing disclosure, wherein these examples may be modified in line with the foregoing disclosure in other example embodiments:

Example 1

| | | | |
|---|---|---|---|
| L1 | skin | about 0.5-2 μm | optionally treated HDPE-modified matte layer (and optionally ≤20 wt. % HCR, waxes and/or COCs such as to promote stretching of this layer) |
| L3 | core | 10 to 50 μm | HDPE (and optionally ≤20 wt. % LLDPE) |
| L5 | skin | 0.5-2 μm | mLLDPE, LLDPE, LDPE or combinations thereof optionally treated optionally primed, coated, and/or metallized |

Example 2

| | | | |
|---|---|---|---|
| L1 | skin | 0.5-2 μm | optionally treated HDPE-modified matte layer (e.g., "modified" because optionally includes ≤20 wt. % HCR, waxes and/or COCs such as to promote stretching of this layer) |
| L2 | tie | 1-5 μm | HDPE |
| L3 | core | 10-50 μm | HDPE (and optionally ≤20 wt. % LLDPE) |
| L4 | tie | 1-5 μm | HDPE + LLDPE + OBC (i.e., olefin block copolymer) |
| L6 | skin | 1 μm | PP-based copolymer(s) and/or terpolymer(s) optionally treated optionally primed, coated, and/or metallized |

In Example 2, in various embodiments, L4's composition contains at least 40 wt. % HDPE, and more preferably, at least 50 wt. %, and still more preferably, at least 60 wt. % in combination with from 10 wt. % through 40 wt. % of each of the LLDPE (or LDPE in some embodiments) and OBC in order to help bind the polypropylene-based polymer(s) in L6 to the HDPE in L3; L2 does not need such binding assistance.

Additives, such as hydrocarbon resins, waxes and/or cyclic olefin copolymers ("COCs"), in the skin layer may modify the HDPE in order to make the skin layer stretchable without fracturing. In one example embodiment, additives may be melted at the stretching temperature, have low viscosity and lubricate the HDPE molecules to help stretch the skin layer. Examples of HCR's include, but are not limited to aliphatic hydrocarbon resins, aromatic modified aliphatic hydrocarbon resins, aliphatic/aromatic resins, polycyclic resins, hydrogenated polycyclic resins, hydrogenated polycyclic aromatic resins, hydrogenated aromatic resins in which a substantial portion of the benzene rings are converted to cyclohexane rings, gum rosins, gum rosin esters, wood rosins, wood rosin esters, tall oil rosins, tall oil rosin esters, polyterpenes, aromatic modified polyterpenes, terpene phenolics, and combinations thereof. Also in example embodiments, L3 may be cavitated, such as with PBT, nylon, solid or hollow pre-formed glass spheres, metal beads or spheres, ceramic spheres, calcium carbonate, talc, chalk, or combinations thereof. In yet more example embodiments, any or all layers may contain slip-migrating additives, antistatic agents or combinations thereof, and L1, L5, and L6 may also antiblock agents.

In addition to the example embodiments shown at Examples 1 and 2, variations from these embodiments exist in keeping with the disclosure. For example, thicknesses of the layers may range as follows: L1, L5 and L6=0.5 to 2 μm; L2, L4=1 to 5 μm; L3=10 to 50 μm.

Turning to the components, below are some tradenames and/or properties of resins that may be used in the disclosed films:

| | |
|---|---|
| ExxonMobil HTA108: | HDPE, MI 190° C./2.16 kg, 0.6 g/10 min, density 0.961; |
| Nova Sclair 19A: | HDPE, MI 190° C./2.16 kg, 0.72 g/10 min, density 0.962; |
| LyondelBasell Alathon M6030: | HDPE, MI 190° C./2.16 kg, 3.0 g/10 min, density 0.960; |
| LyondellBasell Adsyl 5C39F: | ethylene propylene butylene terpolymer, MI 5.5 g/10 min, melting peak 132° C.; |
| mLLDPE: | mLLDPE, MI 1.9, melting peak 127° C.; |
| Borealis Borstar FX1002: | LLDPE, MI 190° C./5 kg, 2.0 g/10 min, density 0.937; and |
| wherein the LLDPE may be metallocene- or ZN-catalyzed or otherwise formed. | |

Haze (ASTM D1003) and gloss (ASTM D2457 at 45°) of the films are affected by the resins. For example, Table 1 reports on the measured haze and gloss of the films presented in Example 1, a three-layered film having an L1/L3/L5 structure as shown above:

TABLE 1

| Layer L1 | Resin | Haze (%) | Gloss (%) | Notes |
|---|---|---|---|---|
| Example 1 | 100% LyondellBasell Adsyl 5C39F | 5 | 75 | non-matte |
| Example 2 | mLLDPE | 10 | 30 | non-matte |
| Example 3 | 100% Borealis Borstar FX1002 | 27 | 30 | non-matte |
| Example 4 | 100% ExxonMobil HTA108 | 56 | 10 | matte film; layer not uniformly stretched |
| Example 5 | LyondelBasell Alathon M6030 + 20% HCR (softening at 140° C.) | 72 | 30 | matte film; uniformly stretched |

It is noted that other embodiments that differ from Example 1 by having different amounts of LLDPE, HCR, and/or OBC in their films' overall compositions result in negligible impact on the measured haze and gloss values. As a result, the above-reported values for haze and gloss also apply to such other embodiments.

Turning now to five-layered films, Table 2 reports on the measured haze and gloss of the film presented in Example 2:

| Layer L1 | Resin | Haze (%) | Gloss (%) | Notes |
|---|---|---|---|---|
| Example 6 | LyondelBasell Alathon M6030 + 20% HCR (softening at 140° C.) | 70 | 25 | matte film; uniformly stretched |

The disclosed films may be reverse printed with a dull appearance, as well as laminated to a polyethylene-based sealant film to produce a mono-material laminate, which can be used to produce bags for food-packaging applications that has the additional advantage of still being recyclable. Given that at least one exemplary skin is matte, this results in an antiblocking surface, which obviates or mitigates a need to add an antiblocking agent, such as one in a polypropylene-based masterbatch. However, an antiblocking agent remains an optional component to skin(s), and if so, then preferably within a polyethylene-based mixture so that the film, whether laminated or not, remains recyclable.

Below are further example embodiments of the disclosed film that are written in claim form:

1. A multilayer film comprising:
   a core layer comprising at least 50 wt. % of high-density polyethylene;
   a first skin layer comprising at least 80 wt. % of high-density polyethylene; and
   a second skin layer comprising either: (i) one or more low-density polyethylenes; or (ii) one or more polypropylene-based copolymers,
   wherein the multilayer film is oriented in at least one direction.
2. The multilayer film of claim 1, further comprising one or more additives.
3. The multilayer film of claim 1, further comprising one or more tie layers.
4. The multilayer film of claim 3, wherein at least one of the one or more tie layers is matte.
5. The multilayer film of claim 3, wherein at least one of the one or more tie layers comprise at least one olefin block copolymer.
6. The multilayer film of claim 3, wherein at least one of the one or more tie layers comprise at least one low-density polyethylene.
7. The multilayer film of claim 3, wherein the one or more tie layers comprise high-density polyethylene.
8. The multilayer film of claim 3, wherein the one or more tie layers comprise at least 40 wt. % high-density polyethylene.
9. The multilayer film of claim 1, wherein the core layer further comprises 20 wt. % or less of linear, low-density polyethylene.
10. The multilayer film of claim 1, wherein the first skin layer further comprises hydrocarbon resin.
11. The multilayer film of claim 1, wherein the first skin layer further comprises cyclic olefin copolymer.
12. The multilayer film of claim 1, wherein the first skin layer further comprises wax.
13. The multilayer film of claim 1, wherein the first skin layer further comprises 20 wt. % or less of hydrocarbon resin, linear, low-density polyethylene, was or combination thereof.
14. The multilayer film of claim 1, wherein at least one of the one or more low-density polyethylenes is metallocene-catalyzed.
15. The multilayer film of claim 1, wherein at least one of the one or more low-density polyethylenes is linear.
16. The multilayer film of claim 1, wherein the multilayer film is treated.
17. The multilayer film of claim 1, wherein the multilayer film is metallized.
18. The multilayer film of claim 1, wherein the multilayer film is coated.
19. The multilayer film of claim 1, wherein the multilayer film is primed.
20. The multilayer film of claim 1, wherein the first skin layer is matte.
21. The multilayer film of claim 1, wherein the first skin layer is laminated to a polyethylene film.
22. The multilayer film of claim 1, wherein the first skin layer comprises an antiblock agent, optionally within a masterbatch solution.
23. The multilayer film of claim 1, wherein haze of the multilayer film is at least about 70% and gloss is at or below about 25%.

While the foregoing is directed to example embodiments of the disclosed invention, other and further embodiments may be devised without departing from the basic scope thereof, wherein the scope of the disclosed compositions, systems and methods are determined by one or more claims.

What is claimed is:

1. A multilayer film comprising:
   a core layer comprising at least 50 wt. % of high-density polyethylene;
   a first skin layer comprising either (a) 20 wt. % or less of hydrocarbon resin and at least 80 wt. % of high-density polyethylene or (b) 20 wt. % or less of linear, low-density polyethylene and at least 80 wt. % of high-density polyethylene; and
   a second skin layer comprising either: (i) one or more low-density polyethylenes; or (ii) one or more polypropylene-based copolymers,
   wherein the multilayer film is biaxially oriented.
2. The multilayer film of claim 1, further comprising one or more additives.
3. The multilayer film of claim 1, further comprising one or more tie layers.
4. The multilayer film of claim 3, wherein at least one of the one or more tie layers is matte.
5. The multilayer film of claim 3, wherein at least one of the one or more tie layers comprise at least one olefin block copolymer.
6. The multilayer film of claim 3, wherein at least one of the one or more tie layers comprise at least one low-density polyethylene.
7. The multilayer film of claim 3, wherein the one or more tie layers comprise high-density polyethylene.
8. The multilayer film of claim 3, wherein the one or more tie layers comprise at least 40 wt. % high-density polyethylene.
9. The multilayer film of claim 1, wherein the core layer further comprises 20 wt. % or less of linear, low-density polyethylene.
10. The multilayer film of claim 1, wherein the first skin layer further comprises cyclic olefin copolymer.
11. The multilayer film of claim 10, wherein the first skin layer further comprises wax.
12. The multilayer film of claim 1, wherein the first skin layer further comprises wax.
13. The multilayer film of claim 1, wherein the first skin layer further comprises linear, low-density polyethylene, wax or combination thereof.
14. The multilayer film of claim 1, wherein at least one of the one or more low-density polyethylenes is metallocene-catalyzed.
15. The multilayer film of claim 1, wherein at least one of the one or more low-density polyethylenes is linear.
16. The multilayer film of claim 1, wherein the multilayer film is treated.
17. The multilayer film of claim 1, wherein the multilayer film is metallized.

18. The multilayer film of claim 1, wherein the multilayer film is coated.

19. The multilayer film of claim 1, wherein the multilayer film is primed.

20. The multilayer film of claim 1, wherein the first skin layer is matte.

21. The multilayer film of claim 1, wherein the first skin layer is laminated to a polyethylene film.

22. The multilayer film of claim 1, wherein the first skin layer further comprises an antiblock agent, optionally within a masterbatch solution.

23. The multilayer film of claim 1, wherein haze of the multilayer film is at least about 70% and gloss is at or below about 25%.

\* \* \* \* \*